(12) United States Patent
Giovanelli et al.

(10) Patent No.: US 7,347,652 B2
(45) Date of Patent: Mar. 25, 2008

(54) METHOD FOR MILLING GROOVES IN BORED WORKPIECES

(75) Inventors: Gian Luca Giovanelli, Castagneto Po (IT); Andrea Gay, Turin (IT)

(73) Assignee: Vigel S.p.A., Borgaro Torinese (IT)

( * ) Notice: Subject to any disclaimer, the term of this patent is extended or adjusted under 35 U.S.C. 154(b) by 0 days.

(21) Appl. No.: 11/802,934

(22) Filed: May 29, 2007

(65) Prior Publication Data
US 2007/0292227 A1 Dec. 20, 2007

(30) Foreign Application Priority Data
Jun. 14, 2006 (EP) .................. 06425400

(51) Int. Cl.
*B23C 3/28* (2006.01)
*B23C 3/34* (2006.01)
*B23Q 15/22* (2006.01)

(52) U.S. Cl. .................. 409/132; 409/66; 409/67; 409/74; 409/200; 409/143; 700/189; 700/187

(58) Field of Classification Search ............ 409/65–71, 409/74, 200, 143, 191, 132, 131; 700/187, 700/186, 189–191, 194; 318/570, 573
See application file for complete search history.

(56) References Cited

U.S. PATENT DOCUMENTS

| 4,381,608 | A | * | 5/1983 | Thormann et al. | ........... 702/198 |
| 4,704,688 | A | | 11/1987 | Kamata | |
| 4,943,191 | A | * | 7/1990 | Schmitt | ................ 409/74 |
| 5,733,078 | A | * | 3/1998 | Matsushita et al. | ........... 409/74 |
| 6,293,740 | B1 | * | 9/2001 | Schulte | ................ 409/66 |
| 2005/0246052 | A1 | | 11/2005 | Coleman et al. | |

FOREIGN PATENT DOCUMENTS

EP 307823 A2 * 3/1989

* cited by examiner

*Primary Examiner*—Erica Cadugan
(74) *Attorney, Agent, or Firm*—Mosiano & Associati; Albert Josif; Daniel J. O'Byrne

(57) ABSTRACT

A numerical control unit issues a sequence of instructions for causing a spindle of a cutter disk in a tool machine to perform successive straight displacements approximating a spiral of Archimedes, with a predetermined angle step from one point to the next, and issues one or more ADIS instructions for merging each of the straight displacements with the next. The spiral path is such that the cutter disk will progressively shave a chip of a predetermined thickness over several revolutions, until its cutting edge is near the intended groove bottom. The tool is then caused to follow a merging path leading to a final point lying on the intended groove bottom, and finally is caused to follow a full circular path coaxial to the bore starting from the final point.

4 Claims, 2 Drawing Sheets

METHOD FOR MILLING GROOVES IN BORED WORKPIECES

The present invention is concerned with a method for milling peripheral grooves in bored workpieces by means of a rotating cutter disk moved along a path around the bore under control of a numerical control unit.

BACKGROUND OF THE INVENTION

Conventional numerical control units are designed to obey a set of pre-defined instructions, and prominent among these are instructions for moving a tool or cutterhead along either a straight path or a circular arc, at a prescribed speed, between two points defined in three rectangular coordinates. Therefore, whenever a different kind of movement is desired, it must be broken down into a succession of straight or circular segments. For each such segment, the control will establish a pattern whereby the cutterhead will first be accelerated to the desired speed of motion, then maintained at a constant speed over the middle portion of its travel, and finally decelerated to a stop over the last portion of the segment.

It is well known to mill circular grooves in the wall of a cylindrical bore, mostly as seats for O-ring gaskets or snap rings, by means of a cutter disk that is orbited or revolved around the internal surface so that the cutter teeth will cut the metal for a desired depth. The numerical control of the tool machine is therefore programmed to move the tool forward along the axis of the bore up to the axial position of the desired groove; then to move the tool along a straight radial path until it bites into the material of the wall for the desired depth of the groove; then to revolve the tool along a circular path to cut the groove; and finally to move the tool back to an axial position along a similar straight radial path, when the revolution around the bore has been completed.

With the above grooving procedure, the groove is generally cut by removing a chip layer having the same thickness as the desired groove depth. The removal of such a thick chip in a single pass subjects the spindle to considerable twisting and bending stresses, which are of a vibratory nature, because of the discontinuous teeth. These stresses have an adverse effect on the finishing quality of the groove and also subject the cutting teeth to a considerable wear, which results in shortened tool life and rough finishing of the groove. If it is desired, particularly in case of a very deep groove, to cut the groove in two or more passes, then the same procedure as above (i.e. approaching path, circular path, receding path) must be carried out repeatedly, with increasing diameters, though with considerable waste of processing time.

Moreover, when the cutter disk approaches the wall, its teeth will abruptly meet both a tangential and a radial resistance from the material of the workpiece, giving rise to both a twisting and a bending stress acting on its stem. Since the stem of the tool has a limited rigidity, it will therefore deflect in a small but non-negligible degree and subsequently relax when the tool starts to follow a path tangential to the wall as it cuts the groove. These fluctuations give rise to bumps or irregularities in the groove, which are compounded with the defects mentioned above.

In order to minimize the above defects, it has been proposed that the cutter disk follows a semicircular rather than a straight path in its approach to the bore wall, so that the tool will attack the material at an acute angle; a similar semicircular path is also followed when the tool is withdrawn. Although this maneuver does lead to a more gradual transition and is easy to implement on a conventional control unit, it only has a moderate favorable influence on the bumps caused by initial contact between the tool and the workpiece, and does not remedy the drawback of the stresses incurred by the cutter disk during the one-pass, deep-cutting machining.

SUMMARY OF THE INVENTION

The aim of the present invention is to provide a method for controlling cutter disks to mill grooves in bored workpieces, by means of ordinary machining instructions conventional control units and with a higher accuracy and a better finishing than attainable with conventional control techniques, without unduly increasing the machining time.

Within this aim, an object of the invention is to provide a method that allows a groove to be easily cut in several passes at increasing depths, so that the stress caused to the tool is kept low and the tool life is extended.

A further object is to provide a method that is easy to implement on conventional numerical control units according to the prevailing standard DIN 66025, by means of ordinary instructions.

The above aim and objects, as well as other objects and advantages that will appear from the following description, are achieved by the invention with a method for milling peripheral grooves in bored workpieces in which a DIN66025-compliant numerical control unit is programmed to move a spindle carrying a cutter disk to a position within the bore at which the cutting edge of the cutter disk is tangent to the wall of the bore at a desired axial position and then to move the spindle along a prescribed plane path to cut a groove in the wall of the bore, wherein the control unit is programmed to determine said plane path by the following steps:

issuing a sequence of instructions for causing straight displacements of the spindle between successive points defined by rectangular coordinates x, y that are calculated by the equations:

$$x(\theta) = \left(R - F + \frac{(R+h)}{(2\pi N)} \cdot \theta\right) \cdot \cos\theta$$

$$y(\theta) = \left(R - F + \frac{(R+h)}{(2\pi N)} \cdot \theta\right) \cdot \sin\theta$$

for $\theta = \theta_o, \theta_o + \Delta\theta, \theta_o + 2\Delta\theta, \theta_o + 3\Delta\theta,$ where
R is the radius of the bore,
F is the radius of the cutter disk,
h is the depth of the groove,
N is approximately the ratio between the depth of the groove (h) and the desired thickness of the chip,
$\theta$ is the angle around the axis of the bore,
$\theta_o$ is the initial angle,
$\Delta\theta$ is a desired angle step;

until a pre-final point (Q) is reached at which said cutting edge is at less than a distance h/N from the intended groove bottom;

issuing ADIS instructions in respect of the above straight-displacement instructions for merging each of said straight displacements with the next;

causing the spindle to follow a merging path from said pre-final point (Q) to a final point (T) lying on a circle having radius R−F+h;

causing the spindle to follow a final circular path coaxial to the bore with radius R−F+h and extending for a full circle from said final point (T).

BRIEF DESCRIPTION OF THE DRAWINGS

The invention will be now described in more detail with reference to a preferred, non-exclusive embodiment shown by way of non limiting example in the attached drawings, wherein.

DESCRIPTION OF THE PREFERRED EMBODIMENTS

Figure 1:
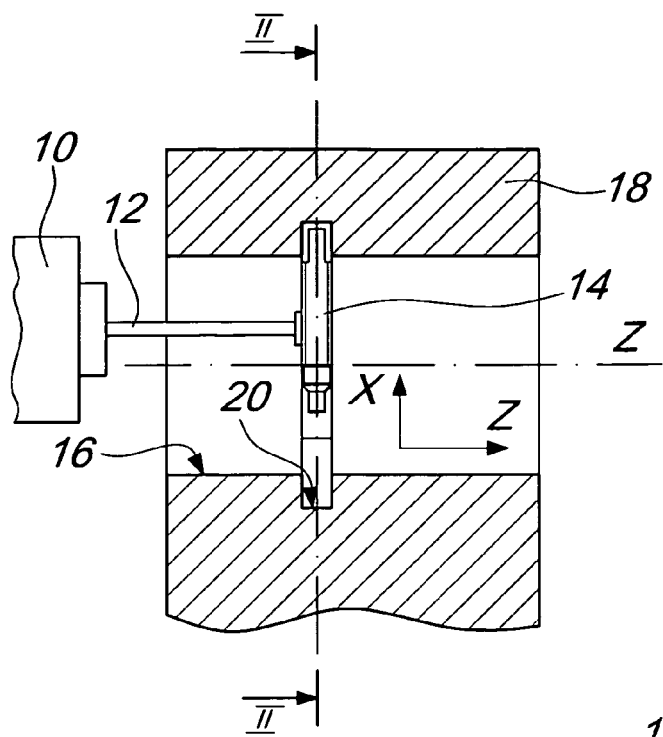
FIG. 1 is a view, in axial cross-section, of a cutter disk as it cuts a circular groove in a bored workpiece.
Figure 2:
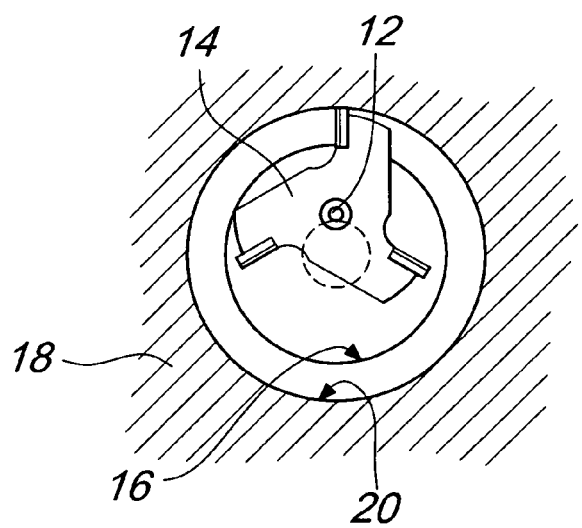
FIG. 2 is a view in cross-section made along lines II-II of FIG. 1.

With reference to FIGS. 1 and 2, a cutterhead 10 of a tool machine not shown has a rotating spindle 12 on which a three-toothed cutter disk 14 is mounted. The cutterhead has previously moved to place the cutter disk coaxially within a bore 16 made in a workpiece 18 having a radius R, at a location along axis z where a circular groove 20 having a depth h is to be milled in the wall of bore 16. Under control of a numerical control unit (not shown), the cutterhead can be moved to lead cutter disk 14 along a desired path so that its cutting edge removes material from the wall to create groove 20 with the same width as the cutter disk and with radius R+h at the groove bottom.

Figure 3:
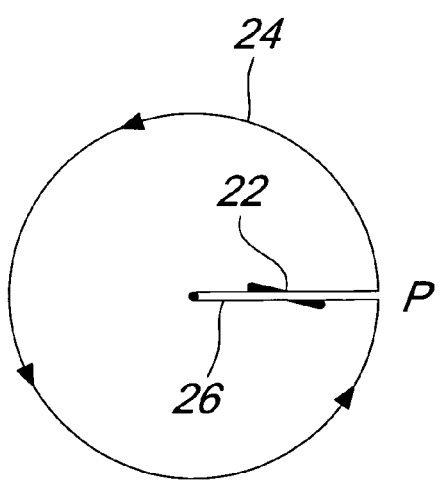
FIG. 3 is a diagrammatic view in a plane at right angles to FIG. 1, showing the path followed by the cutter disk to cut a groove in the bore wall, according to the prior art.

As shown in FIG. 3, the conventional procedure of the prior art is to program the numerical control to:—move spindle 12 with a straight-motion instruction from the axis z of the bore along a radial path 22 to a point P at which the cutting edge of cutter disk 14 has bitten frontally into the wall 16 by the required depth;—move spindle 12 with a circular-motion instruction to travel a full circle 24 around axis z, returning to point P;—move spindle 12 with a straight-motion instruction from point P back to axis z along a radial path 26.

As pointed out above, the procedure of FIG. 3 gives rise to roughness in the groove walls and bottom, particularly with a visible bump at the point where the cutter disk starts and terminates the circular portion of its path. In order to reduce said bump, it has been proposed to use a modification of the procedure of FIG. 3, as shown in FIG. 4.

Figure 4:
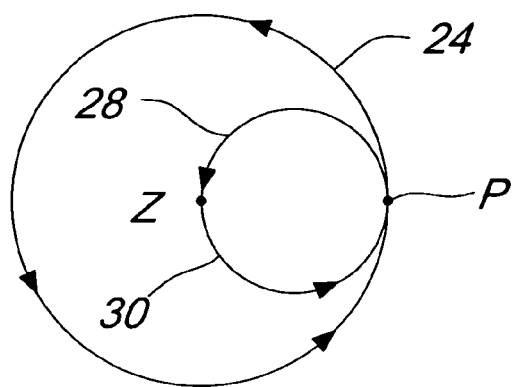
FIG. 4 is a view similar to FIG. 3, showing a modified path according to the prior art.

The procedure of FIG. 4 is similar to FIG. 3, but the first straight path segment from the axis z to point P is replaced by a semicircular path 28, by which a tangential approach to the wall surface is substituted for the frontal approach of FIG. 3. Also, the straight segment from point P back to the axis of the bore is replaced by a semicircular path 30. The middle portion 24 of the overall path is left unchanged to a full circle. This modification insures a soft approach which does reduce the above bump to a certain extent, but does not cure the other defects mentioned in the introduction.

In order to optimize the finish of the groove and prolong the life of the tool, it would be desirable that, rather than removing the full thickness of material in one pass, one could shave the material from the workpiece in a thin, continuous chip having a uniform thickness, the desired final depth of the groove being attained progressively over several passes.

This could be achieved, from a mathematical point of view, if the path traveled by the cutting edge of the tool ideally follows a spiral of Archimedes, as defined, in polar coordinates with origin on the axis z of the bore, by the following equation:

$$r(\theta) = R + \frac{(R+h)}{(2 \cdot \pi \cdot N)} \cdot \theta \quad (1)$$

where
r is the radial distance of the cutting edge from the axis of the bore,
R is the radius of the bore, i.e. the radius at which the cutting starts;
h is the depth of the groove;
N is the number of complete revolutions necessary for reaching depth h by removing a chip of a predetermined thickness, i.e. approximately the ratio between the depth of the groove (h) and the desired thickness of the chip;
θ is the angle around the axis of the bore.

Equation (1) is referred to the position of the cutting edge of the tool, as if it coincided with the spindle axis. In practice, if the cutter disk has a radius F, the initial approach of the spindle to the bore wall must be reduced by the same amount, so that eq. (1) becomes:

$$r(\theta) = R - F + \frac{(R+h)}{(2\pi N)} \cdot \theta$$

For use with numerical controls, the coordinates of the spiral traveled by the spindle must be expressed in rectangular coordinates as follows:

$$x(\theta) = \left(R - F + \frac{(R+h)}{(2\pi N)} \cdot \theta\right) \cdot \cos\theta$$

$$y(\theta) = \left(R - F + \frac{(R+h)}{(2\pi N)} \cdot \theta\right) \cdot \sin\theta$$

Figure 5:
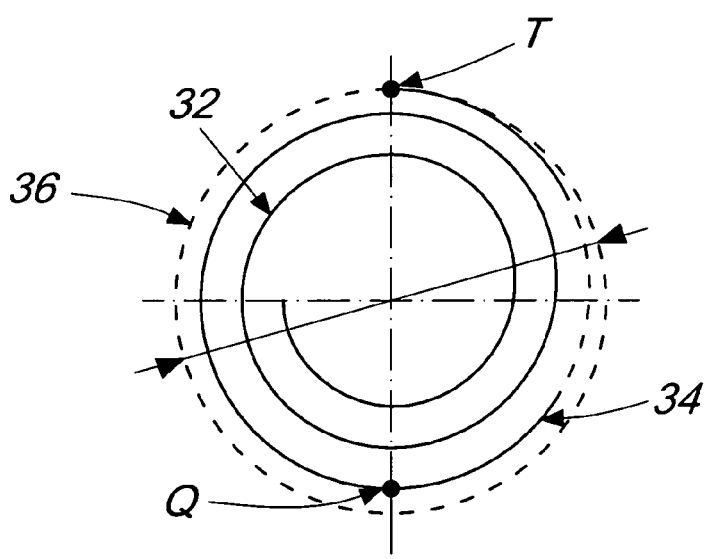
FIG. 5 is a view similar to FIG. 3, showing the path followed by the cutter disk according to the teachings of the invention.

As θ is increased from an arbitrary initial value, the points x, y move forward along the required spiral path. In actual practice of machining by conventional numerical controls, the spiral would have to be approximated by a finite list of points obtained by progressively increasing θ by increments Δθ, and conventional straight-motion instructions would be used to move the tool in rectilinear steps from one point to the next, so that an approximation of the required groove is obtained as a sequence of rectilinear segments. The resulting spiral path is shown in FIG. 5, where the spiral path 32 terminates at point Q, from which a linking half-circular path 34 proceeds to point T, where the cutting is concluded with a final, complete circular path 36, with radius R+h, shown in dotted line, as will be explained below in more detail.

However, with the above straight-line interpolation of the spiral, a very small increment $\Delta\theta$ would have to be used in order to obtain an acceptable quality of the groove, and a very large number of small displacements would have to be programmed. This would be cumbersome and impractical, would be extremely time-consuming, and would have an adverse influence on the finishing quality, because of the incessant accelerations.

Therefore, according to the invention, the interpolation is time-optimized and finishing quality is improved by using the NC smoothing instruction provided in conventional DIN 66025 numerical control units. The smoothing instruction (or ADIS instruction) allows the control unit to overlap the final portion of one travel segment with the initial portion of the next segment, without actually stopping the cutterhead, thereby avoiding an awkward and time-consuming sequence of starts and stops and rounding off corners in the segmented path.

Figure 6:
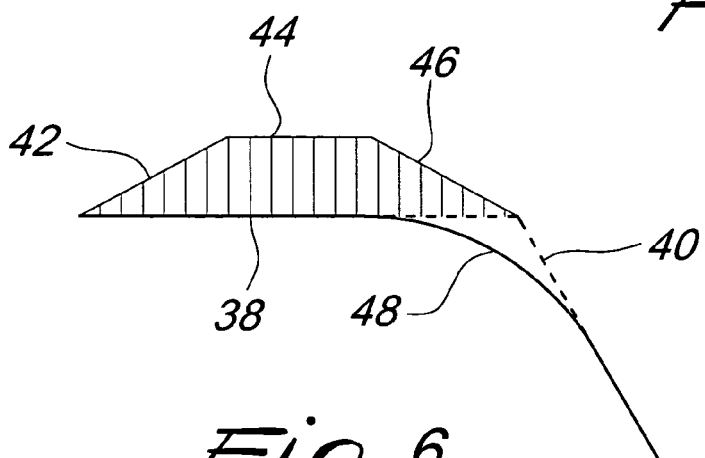
FIG. 6 is a diagram showing a portion of a path of a tool according to the teachings of the invention.

This is shown in the diagram of FIG. 6, where a rectilinear segment 38 of length $L_i$ is followed by another rectilinear segment 40 of length $L_{i+1}$ having a different direction. A cutterhead (not shown) travels along segment $L_i$ with a speed pattern including an acceleration ramp 42 up to a maximum scalar speed Vmax, maintains that speed for a stretch 44, then would normally start a deceleration ramp 46 down to zero speed before starting on the next segment. The point on segment 38 at which the deceleration ramp 46 starts is defined by the critical space $\Delta s$ necessary for coming to a stop at the end of the segment. Such critical space is given by the relation $$\Delta s = \tfrac{1}{2} a \tau^2$$

where a is the acceleration, which is assumed constant over the interpolation stretch, and $\tau$ is a critical time required for deceleration.

According to the invention, an ADIS instruction is programmed before the end of each segment, so that the control unit will start to deflect toward the direction of the next segment, following a rounding-off path 48 which merges the two adjacent segments with each other, without a significant loss of speed.

It can therefore be seen that when a sequence of straight-displacement instructions for the successive segments are alternated with ADIS instructions as described above, the cutterhead will follow a smooth, rounded-off path, which better approximates the desired spiral of Archimedes, at a substantially uniform speed, and with a smaller number of points than would otherwise be necessary, i.e. with a larger stepping interval $\Delta\theta$.

The advance space parameter to be given as an argument to ADIS is not critical. The most appropriate choice at present has been found to be the middle position of the rectilinear segment in the overall spiral path, i.e. about half the product of the radius of the base circle times the angle steps, or $R \cdot \Delta\theta/2$. However, other values, earlier or later that the middle point, can be chosen with acceptable results.

The stepping interval $\Delta\theta$ is also not critical, and depends on the degree of accuracy required and the cycle time allowed. For many applications, a value of 5° has been found appropriate, but this value can change widely, and might well be halved or doubled depending on the circumstances.

The starting approach of the tool to the initial bite into the bore wall preferably follows the "soft approach" mentioned in the introduction, i.e. a semicircular path terminating on the bore wall, although a straight radial motion is also acceptable, because any bumps that would result belong to an area of the metal that will be removed in the next revolution of the cutterhead. On the other hand, the last revolution of the tool must necessarily be circular rather than spiral, so that the finished groove has a constant depth. It would not be appropriate to deflect the path from the spiral to a circle, because there is no common tangent between the two curves at the transition, so that the machining would be compressed by the discontinuity.

Therefore, in order to provide an easy transition from the spiral path to a final circular path, the invention provides that an intermediate linking or merging path is followed by the tool over a limited extent, for instance over a half-revolution. Preferably, the merging path is a semicircle having a common tangent with the final circular path, coaxial with the bore, that the tool must follows to complete the groove. While a linking path so designed will produce no discontinuity at its end point T (see FIG. 6), where it merges with the final circular path, it will necessarily have a discontinuity with the tail of the spiral path at Q, which discontinuity, however, causes no irregularity in the finished groove, because the portion of material where it occurs will be subsequently removed during the final circular pass. Although a semicircular linking path is the most preferred choice, circular arcs of a different amplitude may be used, and even composite straight-curved paths.

If the cutterhead should continue to revolve at the same feeding speed as its radial distance from the bore axis is increased, the cutting speed at the edge of the cutter disk would be progressively increased. Accordingly, in order to maintain the cutting speed constant at a desired value, at each increment $\Delta\theta$ along the spiral the control unit should recalculate the feeding speed of the cutterhead. The calculation, as it may be obvious for persons skilled in the art, consists in multiplying the desired value of the cutting speed by the current ratio between the radial distances of the tool axis and of the cutting edge from the axis of the bore, i.e.

$$f = \frac{r}{(r+F)} \cdot c$$

where
  c is the desired cutting speed;
  f is the required feeding speed on the spindle;
  r is the current radial distance of the spindle from the axis of the bore;
  F is the radius of the cutter disk.

The groove-milling method of the invention is easy to program on conventional, DIN66025-compliant numerical control units using only conventional straight and circular displacement instructions (G1 and G3 instructions) and ADIS instructions, in addition to instructions for ordinary arithmetical and trigonometrical calculations. An example of NC programming embodying the principles of the invention is given below, where the letters XXX in the first eight lines of the program are placeholders for specific figures that would be used in actual programming:

| PROGRAMMING EXAMPLE WITH COMMENTS | | |
| --- | --- | --- |
| N130 | R505 = XXX | ;diameter of base circle |
| N140 | R508 = XXX | ;diameter of final circle |
| N150 | R504 = XXX | ;number of revolutions |
| N160 | R510 = XXX | ;feeding along spiral (on |

-continued

PROGRAMMING EXAMPLE WITH COMMENTS

| | | |
|---|---|---|
| | | tool axis) |
| N170 | R511 = XXX | ;feeding during rounding rev and cleaning rev (on tool axis) |
| N180 | R509 = XXX | ;increment on last half-revolution |
| N190 | R506 = XXX | ;angle step |
| N200 | R501 = XXX | ;starting angle |
| N210 | R507 = R508 − R509 | ;starting point for rounding-off half-rev |
| N220 | R500 = ((R507 − R505)/2)/R504 | ;groove depth/number of revs |
| N230 | G3 X = (R505/2) Y1 = 0 CR = (R505/4) F = R510 | ;half-rev for approaching base circle |
| N240 | WORK: | ;compute coordinates of spiral |
| N250 | IF R501 == R504 * 360 | ;compare current angle with total expected angle |
| N260 | GOTOF END | |
| N270 | ENDIF | |
| N280 | R501 = R501 + R506 | ;increment angle at each loop |
| N290 | ADIS = (R505/2 + R500/360 * R501) * R506/2 | ;round off dynamically |
| N300 | R502 = (R505/2 + R500/360 * R501) * COS(R501) | ;compute X coordinate |
| N310 | R503 = (R505/2 + R500/360 * R501) * SIN(R501) | ;compute Y coordinate |
| N160 | R510 = R511 * (R505/2 + R500/360 * R501)/(R505/2 + 10.6 + R500/360 * R501) | ;calculate feeding speed on tool axis, based on cutting-edge feeding value |
| N320 | G1 X = R502 Y1 = R503 F = R510 | ;move to point of coordinates (X,Y) |
| N330 | GOTOB WORK | |
| N340 | END: | |
| N350 | G3 X = (R508/2) Y1 = 0 CR = (R508 − R509/2))/2 F = R510 | ;final half-rev for rounding off |
| N360 | G3 I = AC(0) J = AC(0) | ;do complete finishing rev |
| N370 | G3 G9X = 0 Y1 = 0 CR = R508/4 | ;reset machine to center of base circle |
| N380 | END2: | |

The main advantage given by the method according to the present invention is that the grooves have a definitely better finishing than could be achieved with prior approaches, mainly because, in contrast to conventional machining, grooves are shaved progressively in a thin continuous chip of uniform thickness over a desired number of revolutions, with lower stress and longer life of the tool. Moreover, the grooves obtained by the inventive method are completely free from bumps or other irregularities caused by initial engagement and final disengagement of the tool with the workpiece, because such irregularities are in all cases shaved off by a subsequent pass.

The disclosures in European Patent Application No. 06425400.6 from which this application claims priority are incorporated herein by reference.

What is claimed is:

1. A method for milling peripheral grooves in bored workpieces, in which a DIN66025-compliant numerical control unit is programmed to move a spindle carrying a cutter disk to a position within a bore at which a cutting edge of the cutter disk is tangent to a wall of the bore at a desired axial position and then to move the spindle along a prescribed plane path to cut a groove in the wall of the bore, wherein the control unit is programmed to determine said plane path by the following steps:

issuing a sequence of instructions for causing straight displacements of the spindle between successive points defined by rectangular coordinates x, y that are calculated by the equations:

$$x(\theta) = \left(R - F + \frac{(R+h)}{(2\pi N)} \cdot \theta\right) \cdot \cos\theta$$
$$y(\theta) = \left(R - F + \frac{(R+h)}{(2\pi N)} \cdot \theta\right) \cdot \sin\theta$$

for $\theta = \theta_o, \theta_o + \Delta\theta, \theta_o + 2\Delta\theta, \theta_o + 3\Delta\theta,$ where
R is the radius of the bore,
F is the radius of the cutter disk,
h is the depth of the groove,
N is approximately the ratio between the depth of the groove (h) and the desired thickness of the chip,
$\theta$ is the angle around the axis of the bore,
$\theta_o$ is the initial angle,
$\Delta\theta$ is a desired angle step;

until a pre-final point Q is reached at which said cutting edge is at less than a distance h/N from a bottom of a groove to be defined;

issuing ADIS instructions respectively associated to the above straight-displacement instructions for merging each of said straight displacements with the next;

causing the spindle to follow a merging path from said pre-final point Q to a final point T lying on a circle having radius R−F+h;

causing the spindle to follow a final circular path coaxial to the bore with radius R−F+h and extending for a full circle from said final point T.

2. The method of claim 1, wherein said merging path is a circular arc from the pre-final point Q to the final point T and having a common tangent with said final circular path.

3. The method of claim 2, wherein said circular arc is a semicircle having its center lying on a diameter of the bore passing through the final point T.

4. The method of claim 1, wherein said ADIS instructions are issued alternately with respective straight-displacement instructions, and are parameterized with a value that is approximately half the product of the sum of the bore radius R and the depth increase h/N at each step times said predetermined angle step $\Delta\theta$.

* * * * *